United States Patent
Kelly

[19]

[11] Patent Number: 5,942,992
[45] Date of Patent: *Aug. 24, 1999

[54] FAST TECHNIQUE FOR CONVERTING BINARY NUMBERS INTO VALUES EXPRESSED IN AN ENGINEERING UNIT FORMAT

[75] Inventor: Christopher P. J. Kelly, Loveland, Colo.

[73] Assignee: Hewlett-Packard Co., Palo Alto, Calif.

[ * ] Notice: This patent is subject to a terminal disclaimer.

[21] Appl. No.: 08/933,717

[22] Filed: Sep. 19, 1997

Related U.S. Application Data

[62] Division of application No. 08/709,594, Sep. 9, 1996, Pat. No. 5,748,105, which is a division of application No. 08/267,020, Jun. 14, 1994, Pat. No. 5,581,247, which is a continuation of application No. 07/792,981, Nov. 15, 1991, abandoned.

[51] Int. Cl.$^6$ ................................................. G08C 19/16
[52] U.S. Cl. ............................... 340/870.21; 340/870.05; 341/106; 364/571.07
[58] Field of Search ..................... 340/870.21, 870.05, 340/870.17; 341/106, 165; 364/571.02, 571.04, 571.05, 571.07, 573, 577, 581, 553, 554, 723

[56] References Cited

U.S. PATENT DOCUMENTS

| | | | |
|---|---|---|---|
| 4,078,250 | 3/1978 | Windsor et al. | 364/715 |
| 4,231,097 | 10/1980 | Shibayama et al. | 364/577 |
| 4,282,578 | 8/1981 | Payne et al. | 364/573 |
| 4,602,285 | 7/1986 | Beaulier et al. | 358/160 |
| 4,818,994 | 4/1989 | Orth et al. | 340/870.21 |
| 4,937,574 | 6/1990 | Wright | 341/106 |
| 5,014,229 | 5/1991 | Mofachern | 364/571.04 |
| 5,155,489 | 10/1992 | Gulczynski | 341/160 |
| 5,165,791 | 11/1992 | Miki et al. | 374/9 |

*Primary Examiner*—Michael Horabik
*Assistant Examiner*—Albert K. Wong

[57] ABSTRACT

An engineering unit converter system for converting an analog measurement into an engineering value. An analog measurement of a physical quantity is transformed into a digital value. The digital value is then split into a high order digit and a lower order digit. The high order digit is used as an address to a memory device for fetching a line segment coefficient and a line segment offset coefficient. The lower order digit is multiplied with the line segment coefficient in a multiplier resulting in a product. The product is added to the line segment coefficient offset resulting in a sum whose value is an engineering unit.

One embodiment is directed to converting temperature measurements into engineering units via thermocouples. This embodiment includes: thermocouple devices, resistance thermal devices or positive temperature coefficient thermistors, adders, multipliers, and memory devices (readable and writable memory devices).

13 Claims, 8 Drawing Sheets

FAST TECHNIQUE FOR CONVERTING BINARY NUMBERS INTO VALUES EXPRESSED IN AN ENGINEERING UNIT FORMAT

CROSS REFERENCE TO RELATED APPLICATION(S)

This is a divisional of application Ser. No. 08/709,594 (U.S. Pat. No. 5,748,105) filed on Sep. 9, 1996, which was a divisional of then application Ser. No. 08/267,020 filed on Jun. 14, 1994 (now U.S. Pat. No. 5,581,247), which was a continuation of then application Ser. No. 07/792,981 filed Nov. 15, 1991, now abandoned.

BACKGROUND OF THE INVENTION

1. Field of the Invention

The present invention relates generally to systems and methods for converting a measurement into engineering units. More particularly, the present invention relates to systems and methods for employing fast techniques of converting analog measurements to engineering units.

2. Related Art

A. General

Many devices depend on measuring a physical quantity, such as temperature or torque, and converting this quantity into a known engineering unit, such as Fahrenheit or Foot Pounds.

Typically, a first step in a conversion process is a transducer. In a typical application, the transducer changes a physical quantity, such as temperature or torque, into a linear or nonlinear proportional voltage. This value is known as an analog voltage that can have any value within a given range.

The transducer is normally interfaced with an analog-to-digital converter, which changes the analog voltage to a digital voltage. The digital voltage can then be expressed as a digital representation of the analog voltage.

In order to be valuable to a user for analysis, most measurements of physical quantities must appear in an engineering units format. Thus, after the analog-to-digital conversion, the resulting data must be converted from a digital value into an engineering unit format. This conversion process, termed engineering unit conversion, is accomplished by interfacing the analog-to-digital converter to a data-acquisition system, which gathers all digital data coming from the analog-to-digital converter. The data acquisition system then applies data to a stored program involving software. The data is then completely evaluated in software by a mathematical equation.

However, these mathematical equations often involve complex polynomial equations increasing computation time and complexity of the data acquisition system. At higher rates of conversion, it becomes impractical to convert voltage measurements of physical quantities, into engineering units. For instance, in a system in which events are represented or acted upon as they occur—"real time"—it is impractical to convert a voltage measurement into engineering units using the above technique of evaluating mathematical formulas at the time of measurement. In such cases, the measurement rate may exceed the ability of the measurement hardware to convert into engineering units. Therefore, measurement quantities are usually recorded in their voltage format, then converted later during a separate data analysis phase.

What is needed is a system and method that obtains engineering units in "real time". In other words, there is a need for a data acquisition device that can perform the entire data gathering process, as well as, the conversion process in "real time."

It is presently possible to perform this conversion in "real time" utilizing very high speed computing devices. However, the cost of employing such devices is prohibitive. Therefore, there is also a need for a device that can perform "real time" conversion at a dramatically smaller cost than is presently possible.

B. Thermocouples

One application of the conversion process mentioned above, involves measuring temperature via a thermocouple device. Thermocouples utilize two dissimilar wires bonded together that are applied to a point where a temperature is to be measured. A temperature gradient along those wires causes a thermoelectric effect generating a voltage across the two wires. This voltage may then be applied to an analog-to-digital converter and then data acquisition conversion devices, as discussed above, resulting in an engineering unit, e.g., Fahrenheit. A problem associated with thermocouples is connecting them to a converting device at sonic intermediate junction with other possibly dissimilar wires. This intermediate junction creates unwanted voltages along these wires due to dissimilar metals and temperatures between the thermocouple device and the converting device. The increased or decreased voltage is thereby transferred to the conversion device, which produces an inaccurate temperature unit reading.

What is needed is a device that obtains engineering units in "real time" and is simultaneously able to compensate for the thermoelectric effect of intermediate wiring junctions relating to thermocouples.

SUMMARY OF THE INVENTION

The present invention relates generally to systems and methods for converting a measurement into engineering units. The present invention includes five embodiments.

According to the first embodiment, the present invention is a system and method for converting an analog measurement into an engineering value. An analog measurement of a physical quantity is transformed into a digital value. The digital value is then split into a high order digit and a lower order digit. The high order digit is used as an address to a memory device for fetching a line segment slope coefficient and a line segment offset coefficient. The lower order digit is multiplied with the line segment slope coefficient in a multiplier resulting in a product. The product is added to the line segment offset coefficient resulting in a sum whose value is an engineering unit.

The second embodiment of the present invention utilizes a re-scaler device for increasing accuracy of the present invention when used with integer or fixed-point digital number formats. An off-line procedure is used to multiply the line segment slope coefficient and the line segment coefficient offset by a pre-scaled coefficient. The re-scaler is used as an offset for correcting for the pre-scaled coefficient.

The third embodiment of the present invention utilizes floating point hardware to compute floating point numerals.

The fourth embodiment of the present invention utilizes parallel memory devices for increasing speed of the system.

According to the fifth embodiment, the present invention is a system for converting a temperature reading to an engineering unit. A thermocouple device is employed for converting the temperature reading to a voltage value. An analog-to-digital converter is then used to convert the voltage value to a digital value. Thereafter, a reference temperature compensation means is utilized to determine an absolute temperature for the reading made by the thermocouple device. This value in turn is then employed as an address means for retrieving slope and offset coefficients from a memory device. A first adder is employed for subtracting the reference coefficient from the digital value resulting in a second digital value having low order bits and high order bits. The above memory device also contains a first coefficient and a second coefficient, whereby the address means is now used for fetching the first coefficient and second coefficient from the memory device. The high order bits are used as an address means for retrieving these coefficients. A multiplier multiplies the lower order bits with the first coefficient fetched from the memory device resulting in a product. Finally, a second adder adds the product from the multiplication operation to the second coefficient fetched from the memory device resulting in an engineering unit.

FEATURES AND ADVANTAGES OF THE INVENTION

One feature of this invention is to provide a fast technique for converting a voltage measurement of a physical quantity into an engineering unit. The present invention is able to perform this conversion process in "real time" for extended periods of time by using a portion of data from an analog-to-digital converter as an address. The present invention is able to function as fast or faster than any existing methods.

Another feature of the present invention is simplicity. Thus, the present invention can be implemented with very simple hardware components making it a far cheaper alternative to other data acquisition devices.

A further feature of the present invention is the ability to simultaneously multiplex several transducers into a data acquisition system and simultaneously perform "real time" conversion. This invention can simultaneously multiplex different transducer types or several identical transducer types, depending on the physical quantity being measured.

An additional feature of this invention is the ability to interface a data acquisition system with floating point binary numbers.

Other features of this invention are also realized in the area of thermocouples. The present invention is able to enhance the accuracy of thermocouple measurements and convert such measurements into engineering units in "real time."

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview

The present invention is directed to a system and method for converting measurements of physical quantities into engineering units. The present invention includes five embodiments. The first embodiment is directed to a generic method and system for converting fixed point numerals into engineering units. The second embodiment is directed to an enhanced method and system for increasing precision of engineering unit conversion. The third embodiment is directed to a method and system for converting floating point numbers to engineering units. The fourth embodiment is directed to a "pipeline" method and system for enhanced speed engineering unit conversion. The fifth embodiment represents a method and system for converting thermocouple measurements to engineering units. The aforementioned embodiments are discussed in the following sections.

2. Fixed Point Method and System

Figure 2A:
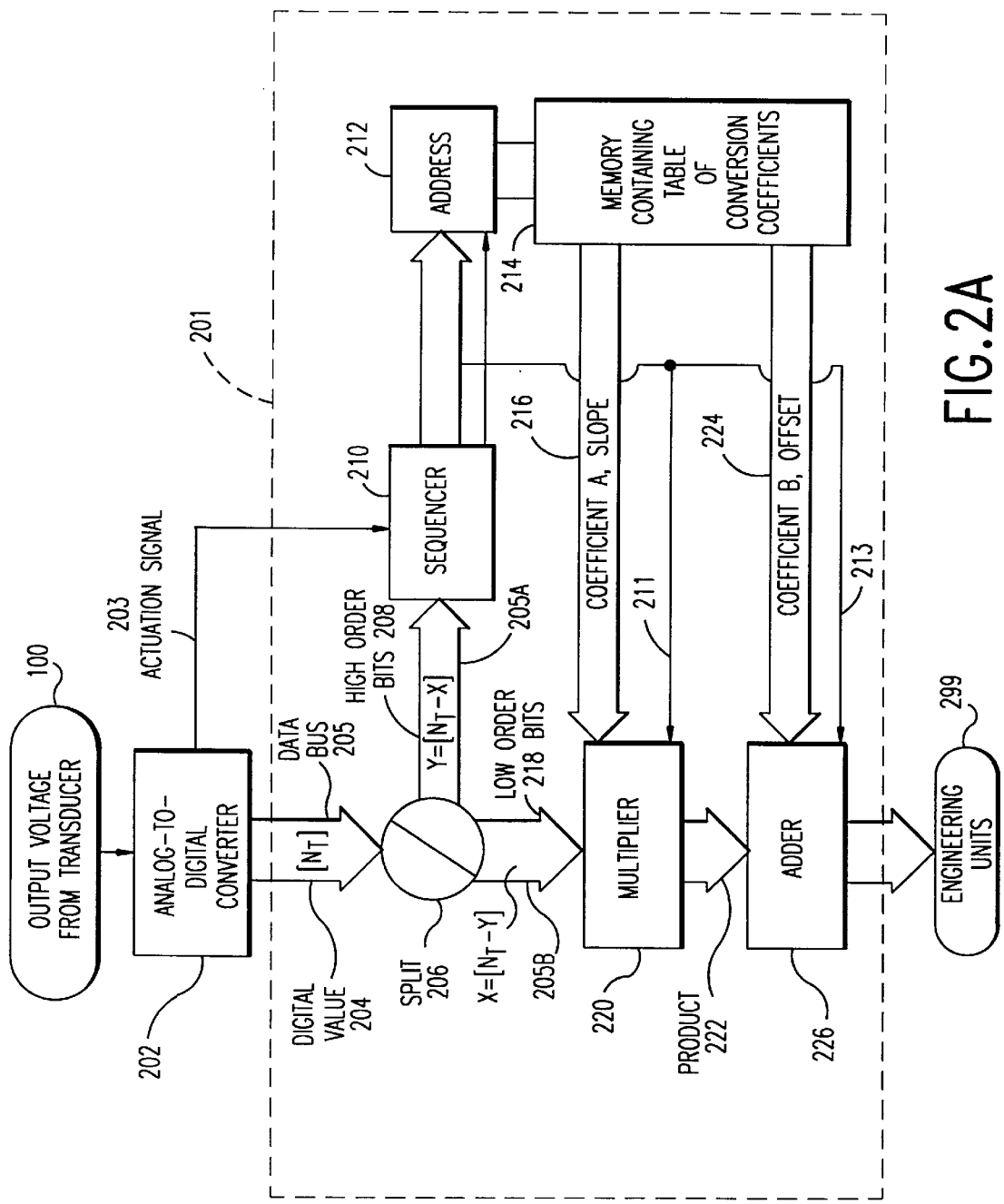
FIG. 2A illustrates a block diagram of the engineering unit converter system of the first embodiment of the present invention.

FIG. 2A illustrates a block diagram of an engineering unit converter system 201 according to a first embodiment of the present invention. As illustrated in FIG. 2A, the engineering unit converter system 201 includes data bus 205, high order bits 208, a sequencer 210, an address 212, a memory device 214, low order bits 218, a multiplier 220, and an adder 226. An analog-to-digital converter (ADC) 202 is coupled to the engineering unit converter system 201. The structure and operation of these elements are well known to those skilled in the art.

Figure 1:
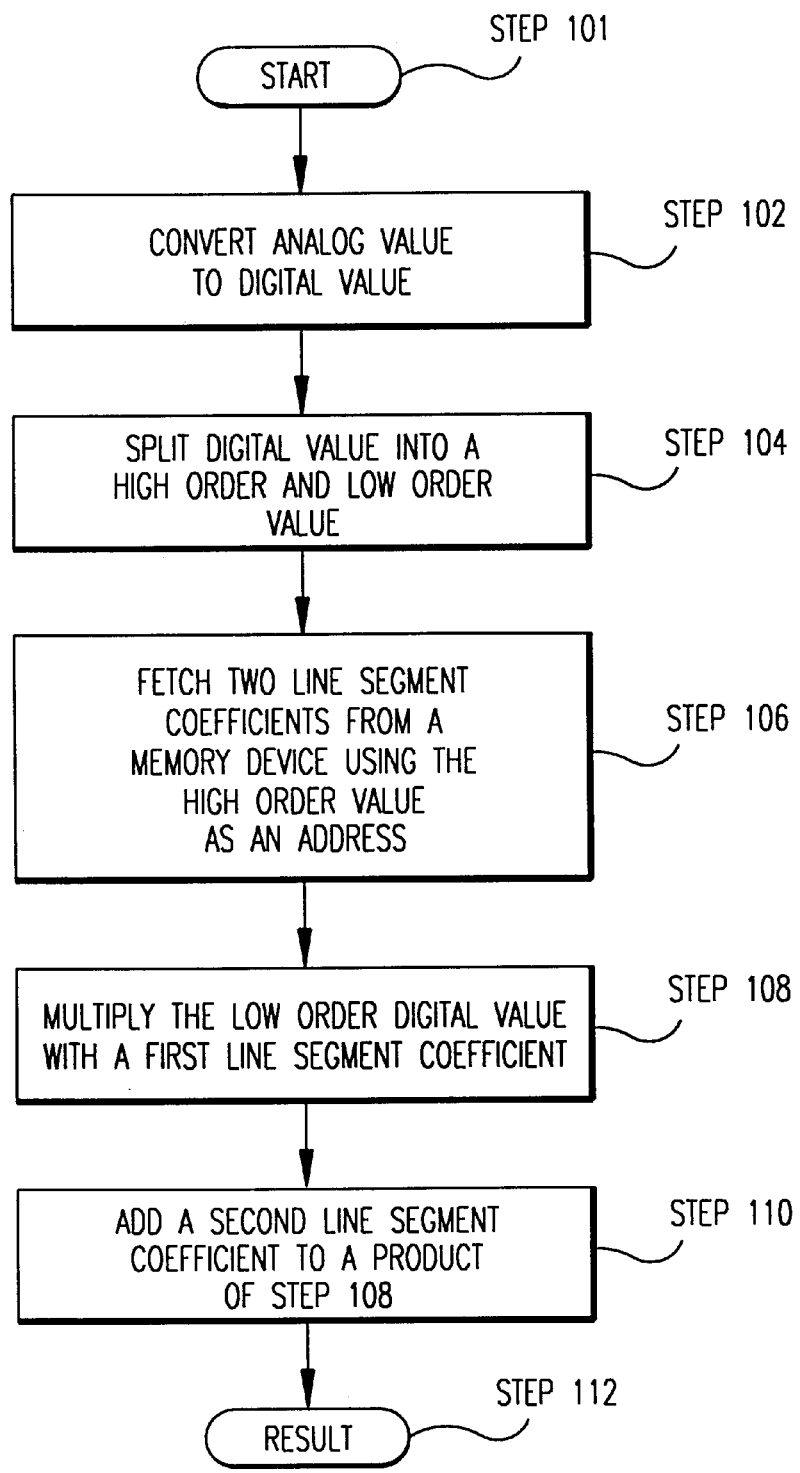
FIG. 1 is a flow chart of an engineering unit converter system in accordance with a first embodiment of the present invention.

The operation of the engineering unit converter system 201 is generally illustrated in the flow chart shown in FIG. 1. Referring to FIG. 1, in step 102 an analog-to-digital converter (ADC) 202 converts an analog voltage value to digital value 204. In step 104, the digital value 204 is split by a split 206 into high order bits 208 and low order bits 218. In step 106, the high order bits 208 are used as the address 212 to fetch data from the memory table 214 containing a table of two coefficients: coefficient A 216 and coefficient B 224. In step 108, coefficient A 216 is multiplied with the low order bits 218. In step 110, a product 222 resulting from step 108 is added to the coefficient B 224 resulting in an engineering unit 299.

The engineering unit converter system 201 will now be described in greater detail. A transducer (not shown) converts a physical quantity into a voltage. This voltage is usually a characteristic of a formula which describes a relationship between the transducer and output voltage. This voltage is represented by the output voltage 100 in FIG. 2A. The output voltage 100 is applied to the ADC 202.

The ADC 202 converts this analog voltage into a digital voltage that is represented as a digital value 204. A data bus 205 carries the digital value 204 to a split 206. A simplified block representation of the data bus 205 is used throughout this embodiment to avoid a confusing array of lines and connections for each bit of data. Connections to and from the data bus 205 are represented by wide arrows. A letter $N_T$ in brackets indicates the total number of bits from the ADC 202. Usually, the ADC 202 is used as a parameter for determining the total number of bits $N_T$ the engineering unit converter system 201 receives. Increasing the number of bits from the ADC 202 increases the resolution of the conversion process. In this embodiment and the following embodiments, a 16 bit ADC 202 is utilized. However, any number of bit ADC converter 202 may be utilized depending on the resolution desired as an engineering unit output 299.

The split 206 in the data bus 205 separates high order bits 208 from low order bits 218. The number of high order bits 208, is equal to $[N_T-X]$, which indicates the total number of bits $[N_T]$ minus the number of low order bits 218 [X] to yield the number of high order bits 208 [Y]. The number of low order bits 218 contained after the split 206 within the data bus 205 would be $[N_T-Y]$ or the total number or bits $[N_T]$ minus the number of high order bits 208 [Y]. In the present example, the total number of bits equals 16, the number of high order bits 208 equals 4 bits, and the number of low order bits 218 equals 12 bits.

The high order bits 208 act as an address 212 and the low order bits 218 remain in a data state as a portion of the digital value 204 coming out of the ADC 202. This conceptual innovation will be explained in more detail below.

The high order bits 208 are transferred via a sequencer 210 to a memory device 214 containing conversion data. The sequencer 210 transfers the high order bits 208 after it receives an actuation signal 203 that a conversion has been completed in the ADC 202. The high order bits 208 act as an address 212 for the memory device 214.

The address 212, formerly the high order bits 208, act as a means to fetch coefficient A 216 and coefficient B 224 from a memory device 214. Coefficient A and coefficient B are points representing linear line segments that approximate the shape of a conversion equation curve (see FIG. 2B) describing a relationship between a voltage measurement of a physical quantity being measured and the Engineering Unit 299 result.

Coefficient A 216 represents a stored slope coefficient of a particular segment of the particular curve depicted by a ratio dy/dx. Coefficient B 224 represents a stored offset coefficient, which is a base or starting point corresponding to the particular segment of the particular curve. Interpolating accuracy improves as more high order bits 208 are utilized as an address 212. As a result there are a corresponding greater number of line segments or points stored in the memory device 214, which more closely approximate the shape of the conversion equation curve.

Figure 2B:
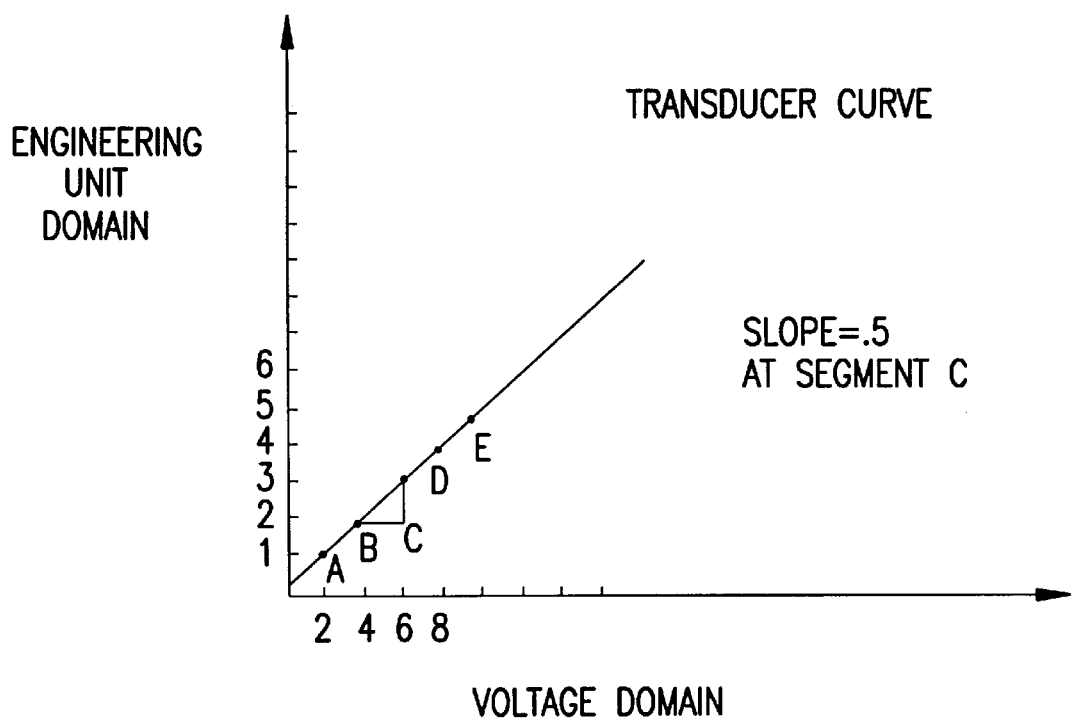
FIG. 2B illustrates an a transducer curve for the first embodiment of the present invention.

The memory device 214 is computed in advance of any measurement, "off-line," and loaded into the memory device 214. An evaluation of a particular transducer must be "pre-processed" to generate this table of memory containing these line segment points; that is coefficient A 216 and coefficient B 224. An example of a transducer curve is illustrated in FIG. 2B. Referring back to FIG. 2A, the memory device 214, may utilize read-only or readable and writable memory devices including: ROM, RAM, SRAM, DRAM, OTP-ROM, EPROM, EEPROM or any other memory device, depending on the application.

Once coefficient A 216 and coefficient B 224 are fetched from memory the sequencer 210 initiates a multiplier 220 via a control signal 211 to multiply coefficient A 216 with the remaining low order bits 218. The low order bits 218 represent an incremental distance along a particular line segment represented by the digital value 208 from the split 206. The multiplication process at the multiplier 220 converts an incremental distance within a line segment from the voltage domain to an incremental distance in the engineering unit domain.

The product 222 from the multiplier 220 enters the adder 226. The sequencer 210 initiates the adder 226 via a control signal 213 to add coefficient B 224 with the product 222. The addition process results in a number whose units are in engineering units 299.

The operation speed of the engineering unit converter system 201 depends upon the speed at which various hardware devices (sequencer 210, memory device 214, multiplier 220, and adder 226) can operate. Depending upon the level of technology used in these devices, Engineering Unit conversion rates can be matched to the ADC 202 conversion rates. Thus, subsystems can be combined into single measurements instruments for providing measurements to Engineering Units in "real time."

As explained above, accuracy for conversion depends upon how closely linear segments approximate the curve of the mathematical conversion function at the point on the curve where the measurement is made.

The engineering unit converter system 201 can select among several transducers, which may drastically vary in calibration. This may be accomplished by implementing the engineering unit converter system 201 with data representing a "transducer number." This information is then used to select among several tables contained within the memory device 214. The actual conversion process is performed by using the "transducer number" as a part of the high order address 212 to the memory device 214. Any number of tables may be stored in the memory device 214, and the "transducer number" becomes a table number for this selection.

3. Enhanced Method and System for Increasing Precision of Engineering Unit Conversion The engineering unit converter system 201 described in the above section represents a minimal implementation of an overall conversion technique.

The hardware used in the engineering unit converter system 201 may be required to convert numbers that are extremely small. Such numbers cannot normally be represented well with fixed point arithmetic (a notation system in which a single set of digits represents a number) as described above.

For example, during the pre-processing operation "off-line" (generating data coefficients for the memory table 214) a number selected for the coefficient A 216, in the memory device 214, should read as 3.14159. However, given resolution limitations of hardware devices it can only be represented as 3.1. Therefore, the multiplier 220 is unable to provide high enough resolution needed to maintain accuracy throughout the engineering unit converter system 201. At the same time, the adder 226 may have the same problem. It may only be possible to represent the number 0.00536 as 0.

Figure 3:
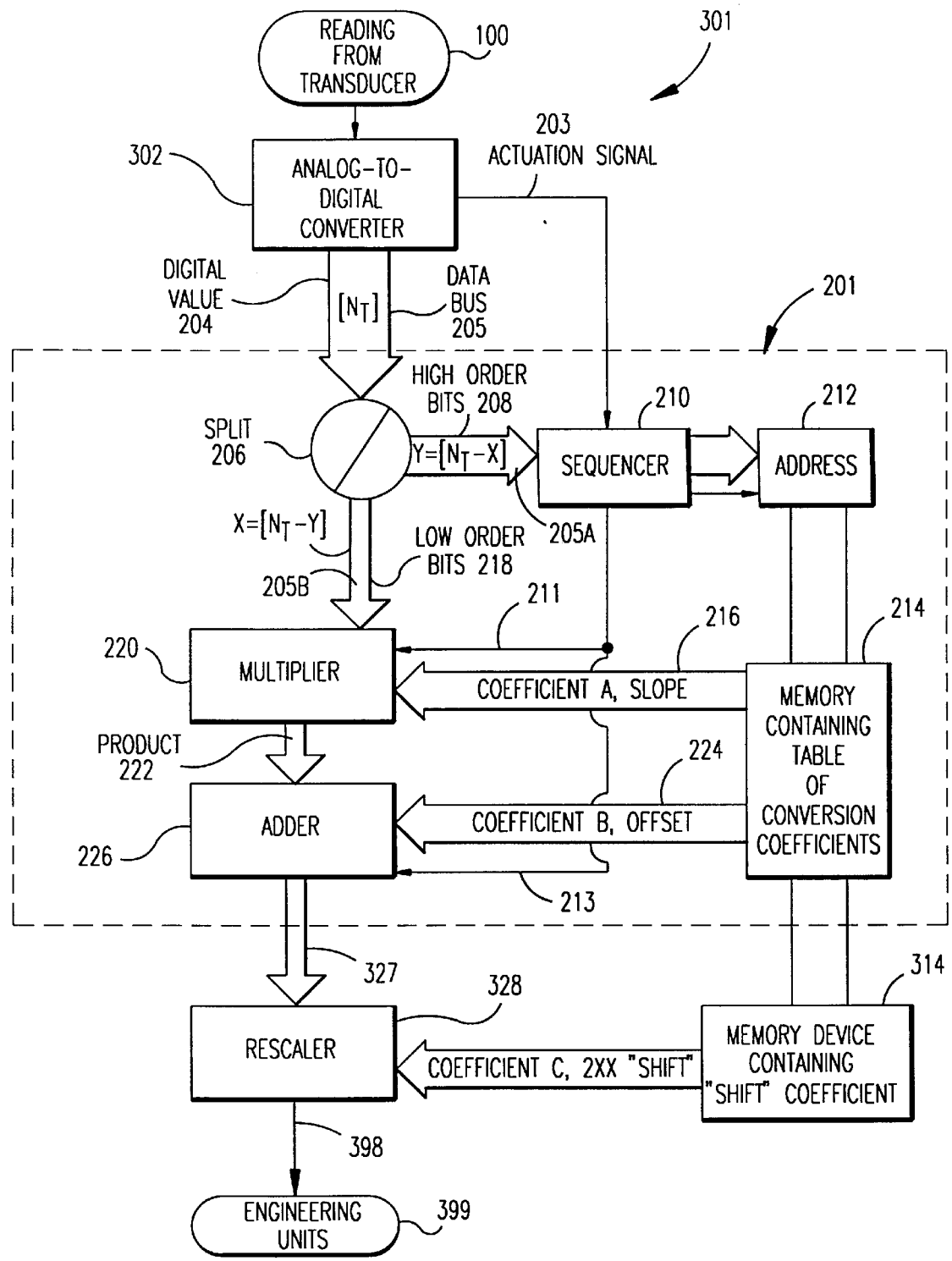
FIG. 3 illustrates a block diagram of an engineering converter system according to a second embodiment of the present invention.

Hence, an enhancement technique may be added to the engineering converter system 201 to correct for this accuracy problem and is shown in FIG. 3.

FIG. 3 illustrates a block diagram of the second embodiment according to the present invention. FIG. 3 includes the engineering unit system 201 of FIG. 2 with the addition of a re-scaler 328 logic device.

In order to obtain optimum resolution, the coefficient A 216 and the coefficient B 224 are multiplied by some large number, coefficient C (not shown). This multiplication process occurs "off-line" via a computer, which is generating a memory table in memory device 314. For example, it is needed to represent the number 3.14159, but the system can only obtain 3.1 out of 3.14159. In order to represent the number 3.14159, the system "pre-scales" or multiplies by 10,000 (in this example) coefficient C (the scale factor will typically be an even power of 2, such as 4096, 8192 or 16384). Then when the conversion process is completed the system divides by 10,000 (coefficient C); the same factor as was used during the "pre-scaling" process.

In order to correct for pre-scaling of coefficient A 216 and coefficient B 224, a re-scaler 328 logic device is implemented. A barrel shifter is one example of a logic device that can function as the re-scaler 328. The re-scaler 328 receives a binary pattern or result 327 from the adder 226. The re-scaler 328 then performs a shift (divide) on the result 327. As explained in the example above, the re-scaler 328 utilizes the same factor coefficient for division (coefficient C from the memory device 314) as was utilized to multiply coefficient A 216 and coefficient B 224, which was performed during the pre-scaling process generated "off-line" by a computer. Engineering Units 399 are obtained at a output 398 of a re-scaler 328.

4. Variation Using Floating Point Numbers

Figure 4:
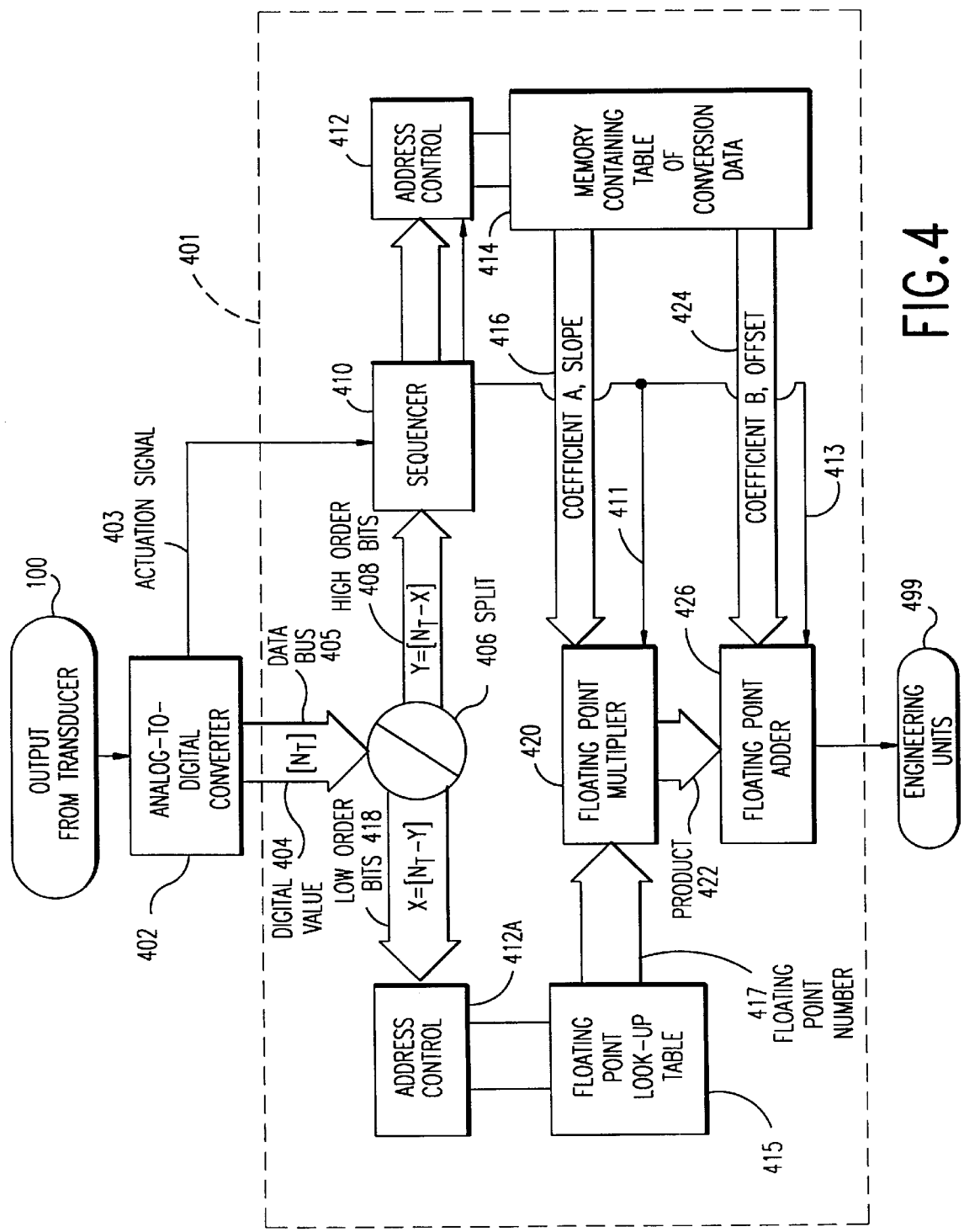
FIG. 4 illustrates a block diagram of an engineering unit converter system according to a third embodiment of the present invention.

FIG. 4 illustrates a block diagram of an engineering unit converter system 401 according to a third embodiment of the present invention. As illustrated in FIG. 4, the engineering unit converter system 401 includes data bus 405, a split 406, high order bits 408, a sequencer 410, addresses 412, a memory device 414, a memory device 415, low order bits 418, a multiplier 420, and an adder 426. An ADC 402 is coupled to the engineering unit converter system 401. The structure and operation of these elements are well known to those skilled in the art.

The operation of an engineering unit converter system 401 is essentially identical to the operation of the engineering unit system 201 of the first embodiment and has essentially the same elements.

Distinctions between the engineering unit converter system 201 and the engineering unit converter system 401 entail the addition of two elements: an address control 412A and an additional memory device 415 containing floating point look-up data. Furthermore, the engineering convertor system 401 is able to process "floating point" binary numbers by using floating point hardware.

The following is a more detailed description of the engineering unit converter system 401, as shown in FIG. 4. The ADC 402 converts an analog voltage into a digital voltage that is represented as a digital value 404. The digital value 404 is represented by an integer format. A data bus 405 carries the digital value 404 to a split 406. The split 406 in the data bus 405 separates high order bits 408 from low order bits 418.

In the present embodiment the high order bits 408 are used as before to act as an address 412 for fetching data from a memory device 414 containing a coefficient A 416 and a coefficient B 424. In this case, however, the coefficients are stored in the floating point format.

In this case, the low order bits 418 are also used as an address 412*a* (instead of data as before) for fetching data from a memory device 415 containing floating-point numbers 417 stored in the memory device 415. The floating-point number 417 is then multiplied with the coefficient A, 416 via the multiplier 420 resulting in a product 422. The product 422 is then added to the coefficient B 424 resulting in a floating-point number 427 representing Engineering Units 499.

Use of floating point format allows maximum resolution at each step without the need for pre-scaling and the re-scaling of a re-scaler device (i.e. a barrel shifter).

5. "Pipeline" Method and System for Enhanced Speed

The memory devices 214, 414 mentioned above store both coefficient A 216, 416 and coefficient B 224, 424 in one memory device. This yields a two step conversion process employing the multiplier 220, 420 in a first time unit, and the adder 226, 426 in a second time unit. Thus, the multiplier 220, 420 is idle during the second time unit, and the adder 226, 426 is idle during the first time unit.

Figure 5:
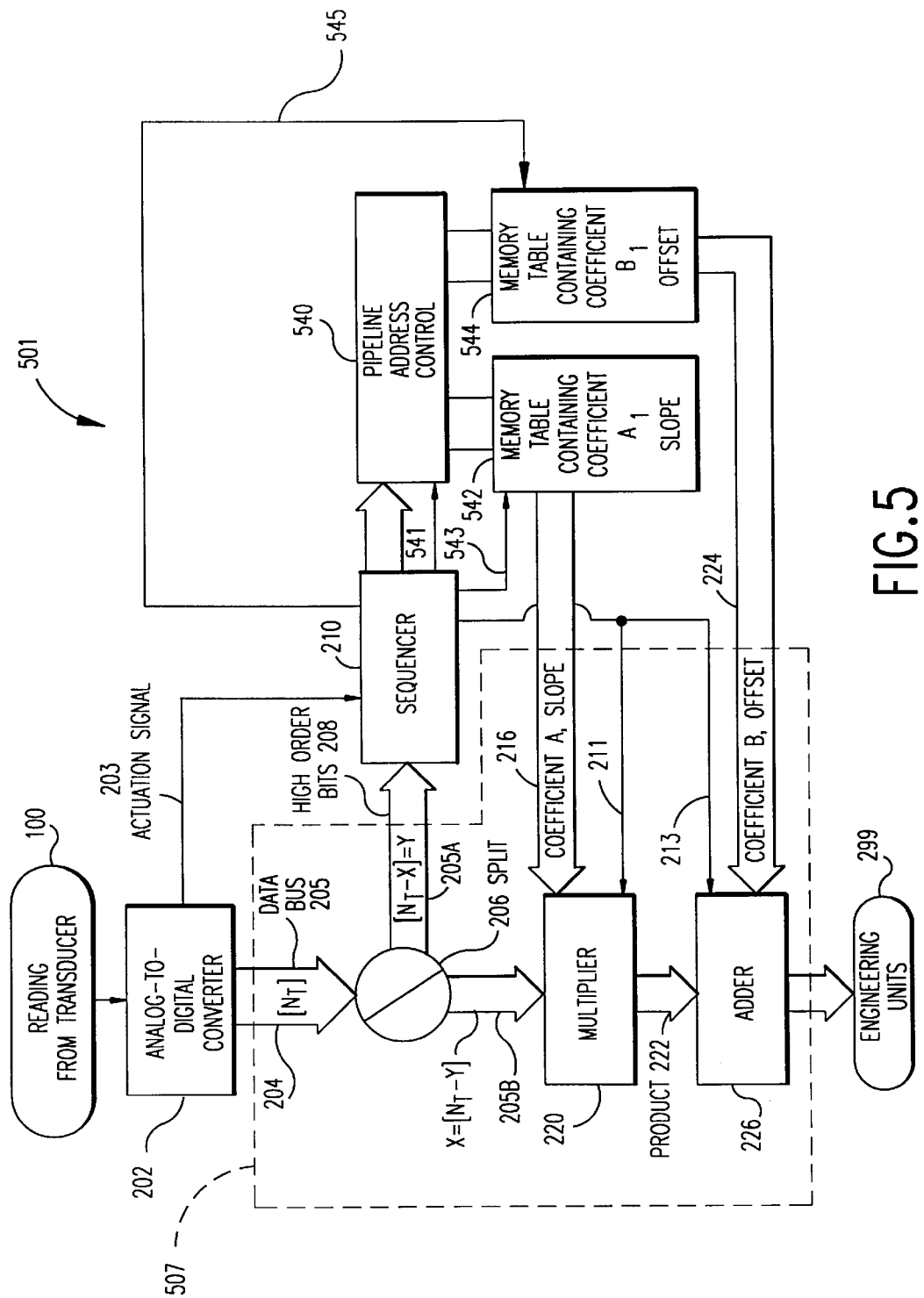
FIG. 5 illustrates a block diagram of an engineering unit converter system according to a fourth embodiment of the present invention.

FIG. 5 illustrates a block diagram of an engineering unit convertor system 501 according to a fourth embodiment of the present invention. The operation of the engineering unit converter system 501 results in a simultaneous multiply and add operation, thereby eliminating two time units to essentially one time unit. Thus, it is possible to double the speed of the conversion process when using devices of a given speed, or allow the use of slower devices to result in the same overall conversion speed.

As illustrated in FIG. 5, the engineering unit converter system 501 includes a data bus 205, a split 206, high order bits 208, low order bits 218 a sequencer 210, a pipeline address control 540, a memory device 542, a memory device 544 a multiplier 220, and an adder 226. Elements of FIG. 5 shown within dotted lines 507, and like numbered elements shown within dotted lines 201 of FIG. 2, function in a similar fashion. A floating-point multiplier 420 and adder 426 can be substituted for multiplier 220 and adder 226, as described in the above embodiments. However, references herein will be made to integer adders and multipliers. An ADC 202 is coupled to the engineering unit converter system 501. Again, the structure and operation of these elements are all well known to those skilled in the art.

The engineering unit converter system 501 will now be described in more detail. The ADC converter 202 converts an analog voltage into a digital voltage that is represented as a digital value 204. A data bus 205 carries the digital value 204 to a split 206. The split 206 separates high order bits 208 from low order bits.

The high order bits 208 are transferred via a sequencer 210 to a pipeline address control 540. The sequencer 210 transfers the high order bits 208 after it receives an actuation signal 203 that a conversion has been completed in the ADC converter 202. The high order bits 208 act as a pipeline address control for two memory tables: memory table 542, containing coefficient A (slope) and memory table 544, containing coefficient B (offset).

By separating coefficient A and coefficient B into memory tables stored in two separate memory devices, a "pipeline" effect may be achieved in which two readings by a transducer (not shown) may be converted simultaneously in an overlapped manner. A first reading 100 from the transducer enters the engineering converter system 501 and is operated upon by the multiplier 220, during time step one. The coefficient A is fetched from the memory device 542 containing coefficients A (slope) only. When this step is completed, the product 222, from the multiplier 220, enters the adder 226, and the multiplier 220, receives another reading 100 immediately. In time step two the second memory device 544 puts out the coefficient B from the first reading. Simultaneously, the first memory device 542 sends out another coefficient A for a second reading 100. The output of coefficients from memory devices 542 and 544 may be controlled entirely by pipeline address control 540, or alternatively, may be regulated by the sequencer 210 via control signals 541, 543 and 545 (as shown in FIG. 5).

At the end of time step two the conversion of the first reading 100 is complete, and the second reading enters the adder 226. Now a third reading may enter the multiplier 220. The conversion process will continue to proceed accordingly.

The engineering unit converter system 501 is not limited to two memory devices 542, 544 in parallel. Implementation of several memory devices connected in parallel is a possible variation of this embodiment. Such a device would utilize identical pipeline address control 540 and would stagger readings between each device.

6. Enhancement for Thermocouple Reference Compensation

Figure 6:
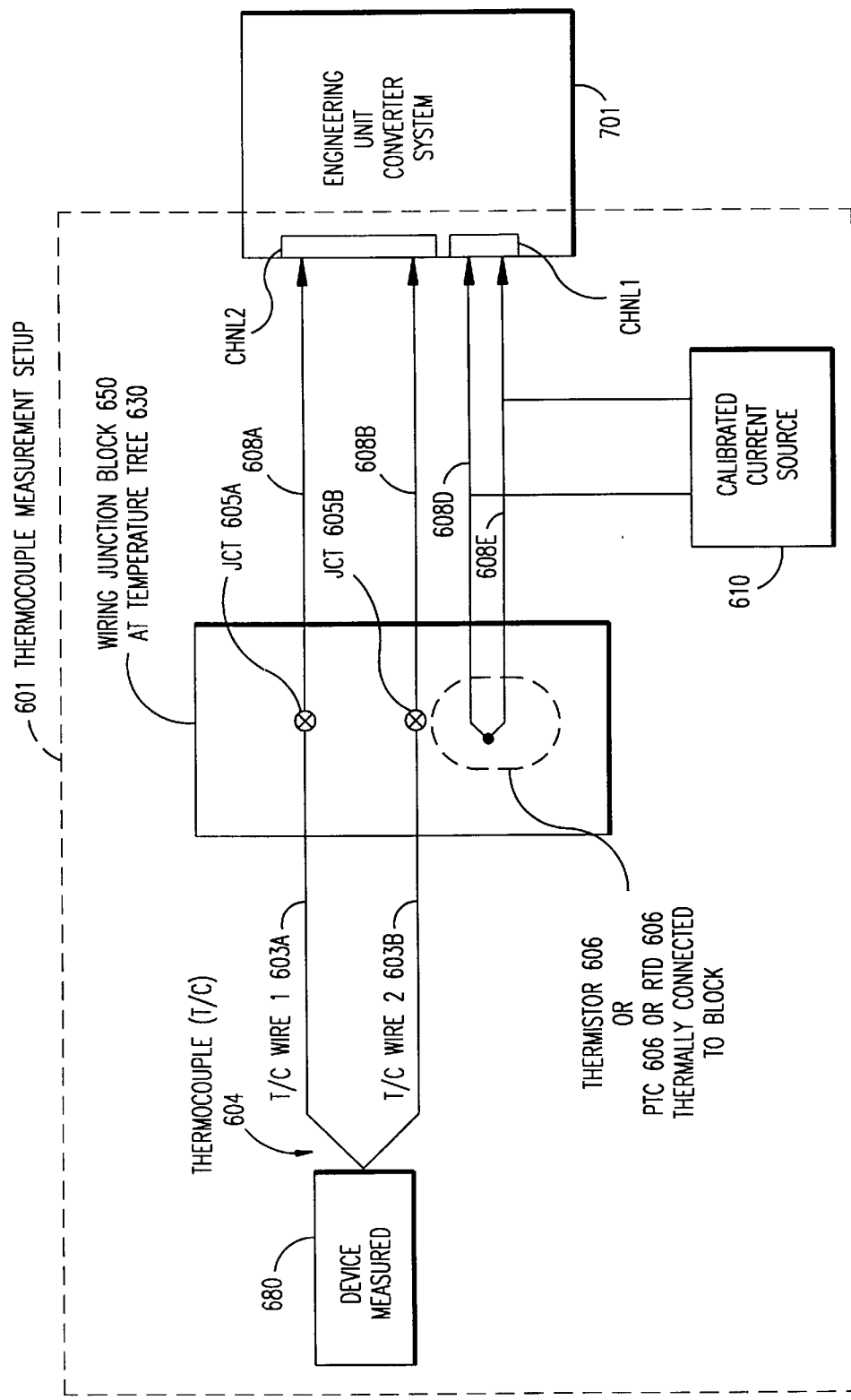
FIG. 6 illustrates one example of an environment in which an engineering unit converter system 701 operates.

FIG. 6 illustrates one example of an environment in which an engineering unit converter system 701 operates. FIG. 6 is a well-known technique for measuring temperature at an intermediate wiring junction. FIG. 6 is included for the purpose of establishing the source of wires 608A, 608B, 608D and 608E used in FIG. 7, which is described below.

As illustrated in FIG. 6 a thermocouple measurement set-up 601 is connected to an engineering unit converter system 701, to be described. The thermocouple measurement set-up 601 includes a thermocouple 604, a device 680, a wiring junction block 650 (which serves as an intermediate junction between the engineering unit converter system 701 and the thermocouple 604) and a calibrated current source 610. Also included in the thermocouple measurement set-up 601 is a thermistor 606. The thermistor 606 could also be a resistance thermal device (RTD) 606 or a positive temperature coefficient thermistor (PTC) 606. For discussion purposes, the RTD 606 will be referred to herein. All elements of hardware are well known and available to those skilled in the art.

In order to measure temperature of device 680, a thermocouple 604 is thermally attached to the device 680. A temperature gradient along wire 603A and dissimilar wire 603B causes a voltage to be generated between them. The voltage between wires 603A and 603B is essentially translated to wires 608A and 608B at junctions 605A and 605B. However, the temperature of the wiring junction block 650 distorts the voltage at junctions 605A and 605B.

The RTD 606 is thermally connected to the intermediate wiring junction block 650 to correct for this distortion. Current from the calibrated current source 610 runs through the RTD 606, causing the RTD 606 to generate a voltage across wires 608D and 608E. This voltage is proportional to resistance of the RTD 606. The resistance of the RTD 606 is proportional to the temperature of the RTD 606. Therefore, the voltage across wires 608D and 608E is proportional to the temperature of the wiring junction block 650. Thus, the RTD 606 on wiring junction block 650 measures absolute temperature 630 of the wiring junction block 650.

Figure 7:
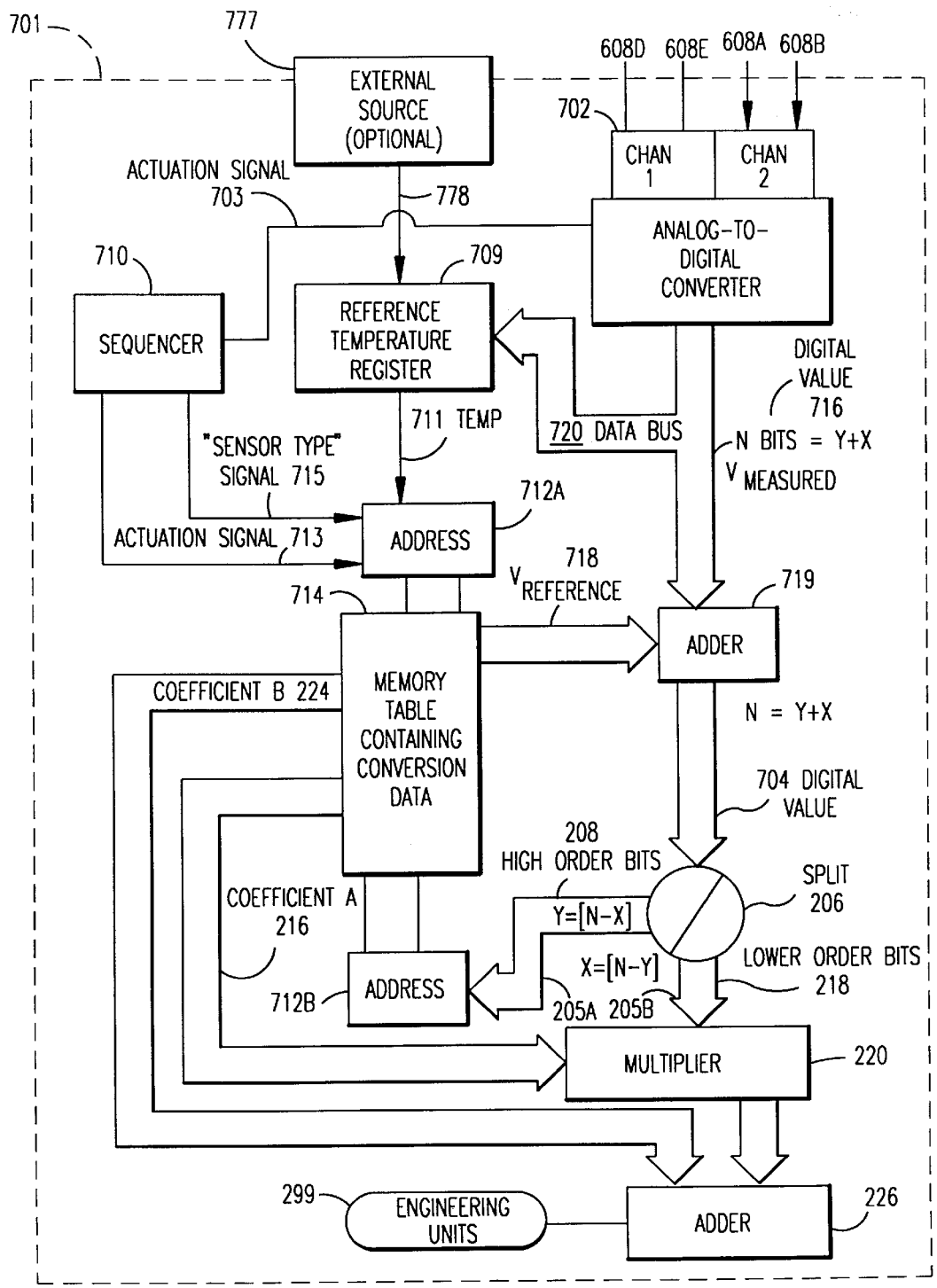
FIG. 7 illustrates a block diagram of an engineering unit converter system according to a fifth embodiment of the present invention.

FIG. 7 illustrates a fifth embodiment of the present invention. FIG. 7 shows an engineering unit converter system 701 adapted for converting measurements from the thermocouple 604.

According to the fifth embodiment of the present invention, the engineering unit converter system 701 receives the voltage between wires 608A and 608B via channel 2 and the voltage between wires 608D and 608E via channel 1. The system 701 uses the voltage between wires 608D and 608E to compensate for the thermoelectric effect associated at the intermediate wiring junction block 650 as described above.

The engineering unit converter system 701 employs general characteristics of the engineering unit converter system 201 illustrated in FIGS. 1 and 2 and may employ any variation of the embodiments described in this application.

The operation of the engineering unit converter system 701 utilizes extended time-sequential operation involving two major steps, each of which contain several minor stops. The major steps include: (1) conversion of reference voltage across wires 608D and 608E into a temperature 711; and (2) conversion of the thermocouple voltage on wires 608A and 608B into a temperature signifying engineering units 299.

In step 1(a), the ADC 702 converts the analog voltage across wires 608D and 608E to a digital value 716. In step 1(b), the digital value 716 is transferred via a data bus 720 to the reference temperature register 709 and is stored for use as a temperature 711 during step 2. The format in which the digital value 716 is stored in the reference temperature register 709 is optional. The digital value 716 may appear in a raw (voltage) format as indicated in this embodiment, or may be passed through an engineering converter system 201 before being stored in the reference temperature register 709. This format selection will affect the structure of tables stored in memory 714, but will not otherwise affect circuit operation.

In step 2, the voltage across wires 608A and 608B will be measured and converted to engineering units 299.

In step 2(a), when the ADC 702 converts the analog voltage across 608A and 608B to a digital value 716, the sequencer 710 indicates, via a "sensor type" signal 715, to the memory address 712A that the digital value 716 is from channel 2. The reference temperature register 709 then sends the signal temperature 711 to the address 712A. This process is performed at the same time as the conversion process of channel 2 is calculated via the ADC 702.

The address 712A selects a particular value within the memory device 714 to be used as Vreference 718. The address 712A is composed of the temperature 711 from the reference temperature register 709. The sensor type signal 715 as a component of the address 712A causes the memory device 714 to select a table allocated for a particular thermocouple type 604 (if more than one thermocouple type 604 is utilized). In other words, the engineering unit converter system 701 can support multiple thermocouple types 604 by having multiple tables (not shown) in the memory device 714, selected by the "sensor type" signal 715.

In step 2(b), the digital value 716 from channel 2 is presented to the adder 719 and the value of Vreference 718 is also presented to the adder 719. The adder 719 subtracts the value of Vreference 718 from the digital value 716. The subtraction at the adder 719 between the Vreference value 718 and the digital value 716 compensates for the thermoelectric effects of the intermediate wiring junctions as discussed in section 6. As a result, N bits of digital value 704 come down from the adder 719 and enter the split 206 of the engineering converter system 701. Thereafter the engineering system converter system 701 operates in a manner similar to converter system 201 as explained under section 2 and illustrated more specifically in FIGS. 1 and 2 (addresses 712B and 212 operate in a similar fashion).

Implementation of this embodiment requires a small time step to be added to the conversion process of a given reading to Engineering Units. However, as noted above this step may also be "pipelined" into an overlapping set of conversions simultaneously processed into Engineering Units.

An alternative technique may be utilized for step 1(c) mentioned above. The value 709, which is loaded into the reference temperature register 709, may be performed by an external source 777. In this example, the temperature at the wiring junction block 650 of FIG. 6 would be actively maintained at a known temperature. Thus, a controlled value 778 would be loaded into register 709 by the external source 777. The external source 777 may be implemented by a computer.

While various embodiments of the present invention have been described above, it should be understood that they have been presented by way of example only, and not limitation.

Thus, the breadth and scope of the present invention should not be limited by any of the above-described exemplary embodiments, but should be defined only in accordance with the following claims and their equivalents.

What is claimed is:

1. A system for converting a digital representation of a transducer output into a value expressed in an engineering unit format, said digital representation of a transducer output having low order bits and high order bits, said system comprising:

at least one memory device for storing a plurality of first and second coefficients;

a sequencer for enabling fetching of a first coefficient and a second coefficient from the plurality of first and second coefficients stored in the at least one memory device, said fetching being in response to the sequencer's receipt of said high order bits of said digital representation of a transducer output;

a multiplier, under control of the sequencer, for multiplying a number identified by the low order bits of said digital representation of a transducer output with the first coefficient fetched from the at least one memory device, thereby producing a product; and an adder, under control of the sequencer, for adding the product to the second coefficient fetched from the at least one memory device, thereby producing a value expressed in an engineering unit format.

2. The system of claim 1, wherein said multiplier and adder are floating point devices.

3. The system of claim 2, further comprising an additional memory device for storing a floating point look-up table, wherein:

the low order bits of said digital representation of a transducer output act as an addressing means for retrieving a floating point coefficient from the floating point look-up table of the additional memory device; and the floating point coefficient serves as the number identified by the low order bits of said digital representation of a transducer output.

4. The system of claim 1, wherein:

the at least one memory device comprises a first memory device and a second memory device;

the first memory device is configured to store the plurality of first coefficients; and the second memory device is configured to store the plurality of second coefficients.

5. The system of claim 4, further comprising a pipeline address control, under control of the sequencer, for providing addresses to the first and second memory devices so as to enable simultaneous processing of data fetched from said first and second memory devices.

6. The system of claim 1, wherein said multiplier and adder are integer devices.

7. The system of claim 1, wherein each of said at least one memory devices are random access memory devices.

8. The system of claim 1, wherein an actuation signal is provided to the sequencer each time a new digital representation of a transducer output is provided to the system.

9. The system of claim 4, wherein said multiplier and adder are floating point devices, and further comprising an additional memory device for storing a floating point look-up table, wherein:

the low order bits of said digital representation of a transducer output act as an addressing means for retrieving a floating point coefficient from the floating point look-up table of the additional memory device; and the floating point coefficient serves as the number identified by the low order bits of said digital representation of a transducer output.

10. The system of claim 4, wherein said multiplier and adder are integer devices.

11. The system of claim 5, wherein said multiplier and adder are floating point devices, and further comprising an additional memory device for storing a floating point look-up table, wherein:

the low order bits of said digital representation of a transducer output act as an addressing means for retrieving a floating point coefficient from the floating point look-up table of the additional memory device; and the floating point coefficient serves as the number identified by the low order bits of said digital representation of a transducer output.

12. The system of claim 5, wherein said multiplier and adder are integer devices.

13. The system of claim 1, wherein the number identified by the low order bits of said digital representation of a transducer output is equivalent to the low order bits of said digital representation of a transducer output.

* * * * *